United States Patent
Kim et al.

(10) Patent No.: US 12,175,912 B2
(45) Date of Patent: Dec. 24, 2024

(54) DISPLAY APPARATUS AND CONTROLLING METHOD THEREFOR

(71) Applicant: Samsung Electronics Co., Ltd., Suwon-si (KR)

(72) Inventors: Kwangmin Kim, Suwon-si (KR); Daegun Kim, Suwon-si (KR); Yonghun Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/456,977

(22) Filed: Aug. 28, 2023

(65) Prior Publication Data

US 2023/0410717 A1 Dec. 21, 2023

Related U.S. Application Data

(63) Continuation of application No. PCT/KR2022/095056, filed on Mar. 16, 2022.

(30) Foreign Application Priority Data

May 7, 2021 (KR) .......................... 10-2021-0059065

(51) Int. Cl.
*G06F 3/01* (2006.01)
*G06F 3/14* (2006.01)
(Continued)

(52) U.S. Cl.
CPC ......... *G09G 3/2085* (2013.01); *G06F 3/1446* (2013.01); *G09G 3/3433* (2013.01);
(Continued)

(58) Field of Classification Search
None
See application file for complete search history.

(56) References Cited

U.S. PATENT DOCUMENTS 10,275,202 B2 4/2019 Jo et al.
10,466,952 B2 11/2019 Jo
(Continued)

FOREIGN PATENT DOCUMENTS

JP H10154113 A 6/1998
JP 2020134808 A 8/2020
(Continued)

OTHER PUBLICATIONS

International Search Report for PCT/KR2022/095056 mailed Jun. 30, 2022, 3 pages.
(Continued)

*Primary Examiner* — Joseph R Haley
(74) *Attorney, Agent, or Firm* — Nixon & Vanderhye P.C.

(57) ABSTRACT

A display apparatus is disclosed. The display apparatus comprises: a first display module having an infrared (IR) signal receiver and a first wired port and second wired port configured to be connected to local area network (LAN) cables; and a second display module having a third wired port and fourth wired port configured to be connected to LAN cables, wherein the first display module is configured to: transmit a received IR signal to the second display module via a first LAN cable connected to the second wired port and third wired port, based on the IR signal received via the IR signal reception unit being a signal for controlling the second display module, and transmit a received control signal to the second display module via a second LAN cable, based on the control signal being received, via the second LAN cable, from an external device connected via the first wired port, and the second display module is configured to transmit an IR signal or a control signal to a neighboring third display module via a third LAN cable connected to the fourth wired port, based on the IR signal or the control signal being received via the first LAN cable.

17 Claims, 12 Drawing Sheets

(51) Int. Cl.
  *G09G 3/20*     (2006.01)
  *G09G 3/34*     (2006.01)

(52) U.S. Cl.
  CPC .............. *G09G 2300/026* (2013.01); *G09G 2310/0243* (2013.01); *G09G 2370/08* (2013.01)

(56) References Cited

U.S. PATENT DOCUMENTS

| | | |
|---|---|---|
| 10,817,242 B2 | 10/2020 | Momose et al. |
| 10,924,798 B2 | 2/2021 | Sivertsen et al. |
| 11,055,052 B2 | 7/2021 | Seo et al. |
| 11,194,537 B2 | 12/2021 | Okada |
| 2007/0103386 A1 | 5/2007 | Hara et al. |
| 2015/0363154 A1 | 12/2015 | Frederick et al. |
| 2019/0012131 A1 | 1/2019 | Mihara |
| 2019/0377535 A1* | 12/2019 | Rycyna ................. H04L 12/28 |
| 2021/0011820 A1 | 1/2021 | Kim |
| 2021/0081159 A1* | 3/2021 | Kaneko ................. G06F 3/1446 |

FOREIGN PATENT DOCUMENTS

| | | |
|---|---|---|
| JP | 6773290 B2 | 10/2020 |
| JP | 6773294 B2 | 10/2020 |
| KR | 20150075827 A | 7/2015 |
| KR | 20160098006 A | 8/2016 |
| KR | 20170114350 A | 10/2017 |
| KR | 20200121182 A | 10/2020 |
| KR | 102206171 B1 | 1/2021 |
| KR | 20210007579 A | 1/2021 |

OTHER PUBLICATIONS

Written Opinion of the ISA for PCT/KR2022/095056 mailed Jun. 30, 2022, 5 pages.

* cited by examiner

DISPLAY APPARATUS AND CONTROLLING METHOD THEREFOR

CROSS-REFERENCE TO RELATED APPLICATIONS

This application is a continuation of International Application No. PCT/KR2022/095056 designating the United States, filed on Mar. 16, 2022, in the Korean Intellectual Property Receiving Office and claiming priority to Korean Patent Application No. 10-2021-0059065, filed on May 7, 2021, in the Korean Intellectual Property Office, the disclosures of each of which are incorporated by reference herein in their entireties.

BACKGROUND

Field

The disclosure relates to a display apparatus including a plurality of display modules, and a controlling method therefor.

Description of Related Art

A display apparatus including a plurality of display modules, e.g., a so-called video wall is being used by being installed in a space wherein a big screen is needed. A user of a display apparatus gets to control a plurality of display modules through an infrared ray (IR) signal, an Ethernet signal, or a universal asynchronous receiver/transmitter (UART) signal, and a conventional display apparatus had to be connected through a plurality of cables transmitting a plurality of signals necessary for controlling a plurality of display modules, and thus there were problems such as the rise of the unit cost of the product and excessive installation time of the product.

Accordingly, there has been a continuous demand for a method for controlling a display apparatus integrally without a plurality of cables transmitting a plurality of signals necessary for controlling a plurality of display modules.

SUMMARY

Embodiments of the disclosure provide a display apparatus that controls a plurality of display modules integrally without connecting a plurality of cables by transmitting an IR signal and a UART signal through a local area network (LAN) cable, and a controlling method therefor.

A display apparatus according to various example embodiments of the disclosure includes: a first display module including an infrared ray (IR) signal receiver, a first wired port and a second wired port configured to be connected to local area network (LAN) cables, and a second display module including a third wired port and a fourth wired port configured to be connected to local area network (LAN) cables, wherein the first display module may, based on an IR signal received through the IR signal receiver being a signal for controlling the second display module, be configured to transmit the received IR signal to the second display module through a first LAN cable connected to the second wired port and the third wired port, based on receiving a control signal through a second LAN cable from an external apparatus connected through the first wired port, be configured to transmit the received control signal to the second display module through the second LAN cable, and the second display module may, based on receiving the IR signal or the control signal through the first LAN cable, be configured to transmit the IR signal or the control signal to a neighboring third display module through a third LAN cable connected to the fourth wired port.

Each of the second wired port and the third wired port may include a first pin corresponding to the IR signal and a plurality of second pins corresponding to the control signal.

The control signal may include a universal asynchronous receiver/transmitter (UART) communication signal or an Ethernet communication signal, and the plurality of second pins may include a pin corresponding to the UART communication signal or a pin corresponding to the Ethernet communication signal.

The first display module may, based on the second display module being connected through the first LAN cable, be configured to: acquire identification information of the second display module, based on identifying that the second display module is a device of the same type as the first display module based on the identification information, allot address identification information to the second display module, and transmit the allotted address identification information to the second display module through the first LAN cable.

The second display module may, based on receiving address identification information allotted to the third display module from the first display module, be configured to transmit the allotted address identification information to the third display module through the third LAN cable.

The first display module may be configured to transmit at least one of the received IR signal or control signal to the second display module based on the address identification information allotted to the second display module.

The first display module may, based on the second display module being connected through the first LAN cable, be configured to acquire identification information of the second display module, and based on identifying that the second display module is a device of a different type from the first display module based on the identification information, be configured to display a guide UI indicating an error in the connection of the display module.

The first display module may, based on receiving a display setting signal through the IR signal receiver after the second display module is connected through the first LAN cable, be configured to transmit the received display setting signal to the second display module through the first pin.

The first LAN cable may include pins corresponding to a plurality of respective signals by different communication methods.

The first display module may, based on receiving a first display setting signal through the IR signal receiver and receiving a second display setting signal from the external apparatus through the second LAN cable after the second display module is connected through the first LAN cable, be configured to assign priorities based on characteristics of the first display setting signal and the second display setting signal.

A method for controlling a display apparatus including a first display module including an infrared ray (IR) signal receiver and a first wired port and a second wired port to which local area network (LAN) cables are connected, and a second display module including a third wired port and a fourth wired port to which local area network (LAN) cables are connected according to various example embodiments may include: based on the first display module receiving an IR signal for controlling the second display module, transmitting the received IR signal to the second display module through a first LAN cable connected to the second wired port and the third wired port, and based on the first display module receiving a control signal through a second LAN cable from an external apparatus connected through the first wired port, transmitting the received control signal to the second display module through the second LAN cable, and based on the second display module receiving the IR signal or the control signal through the first LAN cable, transmitting the IR signal or the control signal to a neighboring third display module through a third LAN cable connected to the fourth wired port.

Each of the second wired port and the third wired port may include a first pin corresponding to the IR signal and a plurality of second pins corresponding to the control signal.

The control signal may include a universal asynchronous receiver/transmitter (UART) communication signal or an Ethernet communication signal, and the plurality of second pins may include a pin corresponding to the UART communication signal or a pin corresponding to the Ethernet communication signal.

The transmitting to the second display module may include: based on the first display module and the second display module being connected through the first LAN cable, acquiring identification information of the second display module, based on identifying that the second display module is a device of the same type as the first display module based on the identification information, allotting address identification information to the second display module, and transmitting the allotted address identification information to the second display module through the first LAN cable.

The transmitting to the third display module may include: based on the second display module receiving address identification information allotted to the third display module from the first display module, transmitting the allotted address identification information to the third display module through the third LAN cable.

According to various example embodiments of the disclosure, a display apparatus can provide field control through an IR signal and a remote control function through an Ethernet signal, etc. by connecting a plurality of display modules through one cable, and thus a user's convenience is improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
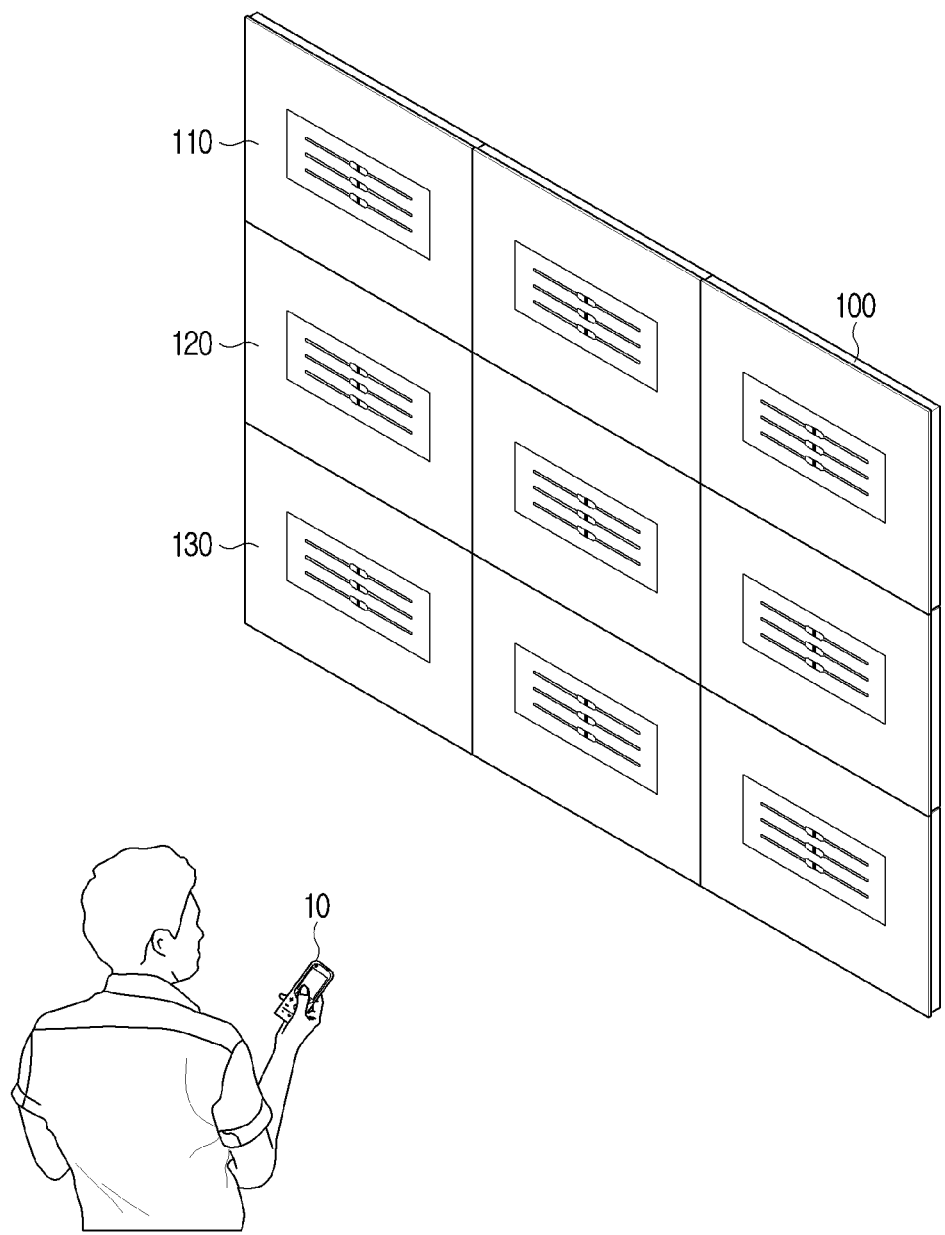
FIG. 1 is a diagram illustrating a control process of a display apparatus according to various embodiments.

Hereinafter, the disclosure will be described in greater detail with reference to the accompanying drawings.

As terms used in the describing the various example embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily selected, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In the disclosure, expressions such as "have," "may have," "include," and "may include" denote the existence of such characteristics (e.g.: elements such as numbers, functions, operations, and components), and do not exclude the existence of additional characteristics.

The expression "at least one of A and/or B" should be interpreted to be any one of "A" or "B" or "A and B."

The expressions "first," "second," and the like used in the disclosure may be used to describe various elements regardless of any order and/or degree of importance. Such expressions are used to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Meanwhile, singular expressions include plural expressions, unless defined differently in the context. Also, in the disclosure, terms such as "include" and "consist of" should be construed as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented as hardware or software, or as a combination of hardware and software. A plurality of "modules" or a plurality of "parts" may be integrated into at least one module and implemented as at least one processor (not shown), except "a module" or "a part" that needs to be implemented as specific hardware.

In the disclosure, the term "user" may refer to a person who uses a display apparatus. Hereinafter, the disclosure will be described in detail with reference to the accompanying drawings.

FIG. 1 is a diagram illustrating an example control process of a display apparatus according to various embodiments.

According to FIG. 1, a display apparatus 100 according to various embodiments of the disclosure may include a plurality of display modules.

For example, as illustrated in FIG. 1, the display apparatus 100 according to various embodiments of the disclosure may include, for example, and without limitation, nine display modules 110, 120, 130, etc. Here, each display module 110, 120, 130, etc. may be physically connected and comprise one display.

Meanwhile, each of the display modules 110, 120, 130, etc. may be implemented as displays in various forms such as, for example, and without limitation, a liquid crystal display (LCD), an organic light emitting diodes (OLED) display, a quantum dot light-emitting diodes (QLED) display, a plasma display panel (PDP), etc.

Each display module may be connected with another neighboring display module, and implement the display apparatus 100 according to the disclosure. As an example, each of the plurality of display modules 110, 120, 130, etc. may be connected by a daisy chain method with each other, but the disclosure is not necessarily limited thereto. Here, the display apparatus 100 including the plurality of display modules 110, 120, 130, etc. may also be referred to as a wall display or a video wall, etc., according to an embodiment.

For example, as illustrated in FIG. 1, the plurality of display modules 110, 120, 130, etc. may be connected in a 3*3 form. Meanwhile, the 3*3 arrangement is merely an example, and the arrangement form and the number of the plurality of display modules included in the display apparatus 100 may vary depending on embodiments.

The display apparatus 100 may display an image through the plurality of display modules 110, 120, 130, etc. Here, an image may not only be an image received from an external apparatus (e.g., a set-top box, a computer, a server, etc.), but it may also be an image prestored in the display apparatus 100. Specifically, the plurality of display modules 110, 120, 130, etc. may display each of a plurality of segmented images that segmented one image. For this, the plurality of display modules 110, 120, 130, etc. may determine image data corresponding to identification information of each display module 110, 120, 130, etc. in the input image data based on identification information set for each display module 110, 120, 130, etc.

Here, the identification information of each display module 110, 120, 130, etc. may be predetermined (e.g., specified) for each display module 110, 120, 130, etc. based on the arrangement form of the plurality of display modules 110, 120, 130, etc. (or, location information of the plurality of display modules) As an example, as illustrated in FIG. 1, in case the plurality of display modules 110, 120, 130, etc. are arranged in a 3*3 form, for the first display module 110, identification information for displaying an image of a first area (e.g., the upper left area) among images corresponding to the input image data may be set, and for the second display module 120, identification information for displaying an image of a second area (e.g., the middle left area) among the images corresponding to the input image data may be set, and for the third display module 130, identification information for displaying an image of a third area (e.g., the lower left area) among the images corresponding to the input image data may be set.

The display modules 110, 120, 130, etc. may display the images based on the determined image data. Accordingly, the display apparatus 100 according to various embodiments may display one whole image wherein the segmented images displayed by the plurality of display modules 110, 120, 130, etc. are combined.

Meanwhile, the display apparatus 100 according to various embodiments may change the setting information of each display module 110, 120, 130, etc. for providing one whole image. Here, in the setting information, various kinds of information that determines visual elements of images provided by each display module 110, 120, 130, etc. may be included, including brightness, chroma, and a gamma value, etc. Also, in the setting information, sound outputs of each display module 110, 120, 130, etc., location information or identification information within a video wall may be included. Hereinafter, operations of the display apparatus 100 will be described by expressing the operation of changing the setting information of each display module 110, 120, 130, etc. as 'controlling the display module.'

A user may control the display modules 110, 120, 130, etc. included in the display apparatus 100 through a remote control apparatus 10. According to various embodiments, a first display module 110 may include an IR signal receiver that receives an infrared ray (IR) signal received from the remote control apparatus 10. The first display module 110 that received an IR signal from the remote control apparatus 10 through the IR signal receiver can integrally control the plurality of display modules 110, 120, 130, etc. included in the display apparatus 100 by transmitting the received IR signal to second and third display modules, etc. Hereinafter, such a control method will be described as a term 'field control.'

Meanwhile, although not illustrated in FIG. 1, the display apparatus 100 can also integrally control the plurality of display modules 110, 120, 130, etc. by receiving a control signal transmitted from an external apparatus by a universal asynchronous receiver/transmitter (UART) or an Ethernet method, and transmitting the received control signal to the second and third display modules, etc. Hereinafter, such a control method will be described as a term 'remote control.'

Hereinafter, various example embodiments wherein the first display module 110 may transmit a received IR signal or control signal to the plurality of display modules 110, 120, 130, etc. included in the display apparatus 100 through one cable will be described in greater detail.

Figure 2:
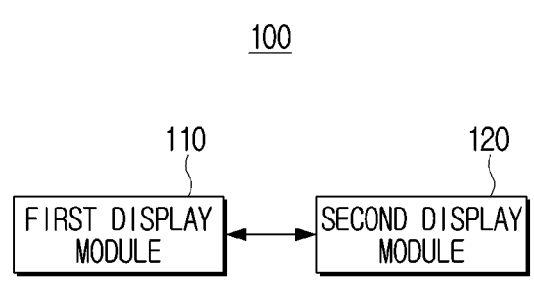
FIG. 2 is a block diagram illustrating an example configuration of a display apparatus according to various embodiments.

FIG. 2 is a block diagram illustrating an example configuration of a display apparatus according to various embodiments.

According to FIG. 2, the display apparatus 100 may include a first display module 110 and a second display module 120. The first display module 110 may include an IR signal receiver and a first wired port and a second wired port to which local area network (LAN) cables are connected, and the second display module 120 may include a third wired port and a fourth wired port to which LAN cables are connected. The detailed configurations of the first and second display modules 110, 120 will be described in greater detail below with reference to FIG. 3 and FIG. 4.

If an IR signal received through the IR signal receiver is a signal for controlling the second display module, the first display module 110 according to various embodiments of the disclosure may transmit the received IR signal to the second display module through a first LAN cable connected to the second wired port and the third wired port.

In case the first display module 110 received a control signal through a second LAN cable from an external apparatus connected through the first wired port, the first display module 110 may transmit the received control signal to the second display module through the second LAN cable.

Meanwhile, the second display module 120 according to various embodiments of the disclosure may, if an IR signal or a control signal is received through the first LAN cable, transmit the IR signal or the control signal to a neighboring third display module through a third LAN cable connected to the fourth wired port.

An unshielded twisted pair (UTP) LAN cable that may be used as an international standard includes eight wires in total, and the first wire to the third wire and the sixth wire may be wires for transmitting and receiving an Ethernet communication signal.

On both ends of a LAN cable according to various embodiments, coupling portions that are coupled with a wired interface of a display module may be provided, and in each coupling portion, pins of the same number as the number of the wires included in the LAN cable may be included. Each pin is connected to a wire of the corresponding LAN cable, and according to various embodiments, the first pin to the third pin and the sixth pin included in a coupling portion of a LAN cable may be pins for transmitting and receiving an Ethernet communication signal.

According to various embodiments of the disclosure, the display apparatus 100 may transmit and receive an IR signal through the remaining wires excluding the wires for transmitting and receiving an Ethernet communication signal in a LAN cable connecting each display module. For example, the display apparatus 100 may transmit and receive an IR signal through the seventh wire of a LAN cable. However, this is merely an example, and the display apparatus 100 may transmit and receive an IR signal through the fifth wire, etc. of a LAN cable.

The display apparatus 100 may transmit and receive a control signal through the first wire to the third wire and the sixth wire. Here, the control signal may be an Ethernet communication signal. According to various embodiments, the display apparatus 100 that received a UART communication signal necessary for remote control from the external apparatus may convert the UART communication signal into an Ethernet communication signal, and transmit and receive the converted signal through the first wire to the third wire and the sixth wire.

Meanwhile, in the same manner by which the display apparatus 100 transmits and receives an IR signal through a separate wire, the display apparatus 100 may not convert a UART communication signal into an Ethernet communication signal, but transmit and receive the UART signal through the remaining wires excluding the wires for transmitting and receiving an Ethernet communication signal. For example, the display apparatus 100 may transmit and receive an IR signal through the seventh wire, and transmit and receive a UART signal through the fifth wire.

To the second wired port of the first display module 110 and the third wired port of the second display module 110 according to various embodiments, both ends of a cable may be coupled. For this, each of the second wired port and the third wired port may include a first pin corresponding to an IR signal and a plurality of second pins corresponding to a control signal. Specifically, the first pins included in the second and third wired ports may be the fifth pins coupled to the fifth wire of the cable through which the display apparatus 100 transmits and receives an IR signal, and the second pins may be the first pin to the third pin to the sixth pin that are coupled with the first wire to the third wire and the sixth wire of the cable through which the display apparatus 100 transmits and receives a control signal.

Meanwhile, when the second display module 120 is connected through the first LAN cable, the first display module 110 may acquire identification information of the second display module 120, and identify whether the second display module 120 is a device of the same type as the first display module 110 based on the acquired identification information.

If it is identified that the second display module 120 is a device of the same type as the first display module 110, the first display module 110 may allot address identification information to the second display module 120, and transmit the allotted address identification information to the second display module 120 through the first LAN cable.

Here, the second display module 120 may, if address identification information allotted to the third display module is received from the first display module 110, transmit the allotted address identification information to the third display module through the third LAN cable connecting the second display module 120 and the third display module.

The first display module 110 may transmit at least one of the received IR signal or control signal to the second display module 120 based on the address identification information allotted to the second display module 120.

Meanwhile, the first display module 110 may, if it is identified that the second display module 120 connected through the first LAN cable is a device of a different type from the first display module 110, display a guide UI indicating an error in the connection of the display module.

The first display module 110 may, if a display setting signal is received through the IR signal receiver after the second display module 120 is connected through the first LAN cable, transmit the received display setting signal to the second display module 120 through the first pin.

The first display module 110 may, if a first display setting signal is received through the IR signal receiver and a second display setting signal is received from the external apparatus through the second LAN cable after the second display module 120 is connected through the first LAN cable, give priorities based on characteristics of the first display setting signal and the second display setting signal.

Figure 3:
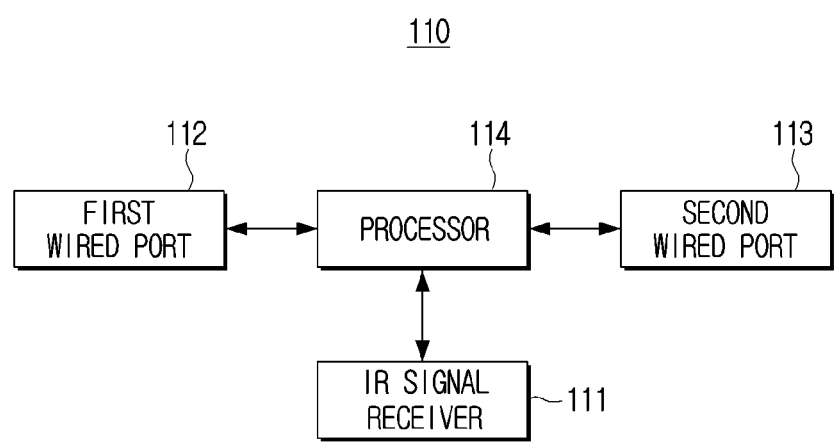
FIG. 3 is a block diagram illustrating an example configuration of a first display module according to various embodiments.

FIG. 3 is a block diagram illustrating an example configuration of a first display module according to various embodiments.

According to FIG. 3, the first display module 110 may include an IR signal receiver (e.g., including IR signal receiving circuitry) 111, a first wired port 112, a second wired port 113, and a processor (e.g., including processing circuitry) 114.

The IR signal receiver 111 may include various IR signal receiving circuitry and receive an IR signal transmitted from the remote control apparatus, etc. The IR signal receiver 111 according to various embodiments may include a coupling portion that is coupled to a separate port provided on the first display module 110, and a receiver receiving an IR signal. Other display modules as well as the first display module 110 may also include the IR signal receiver 111, but in the disclosure, operations of the display apparatus 100 will be described based on the premise that the first display module 110 transmits an IR signal received through the IR signal receiver 111 to another display module through one cable.

The first wired port 112 is a component to which the second LAN cable connecting the first display module 110 and the external apparatus is coupled. The first wired port may include a plurality of pins corresponding to the first pin and the plurality of second pins included in the coupling portion of the first LAN cable.

The second wired port 113 is a component to which the first LAN cable connecting the first display module 110 and the second display module 120 is coupled. The second wired port may include a plurality of pins corresponding to the first pin and the plurality of second pins included in the coupling portion of the first LAN cable.

The processor 114 may include various processing circuitry and controls the overall operations of the first display module 110. For example, the processor 114 may be connected with each component of the first display module 110, and control the overall operations of the first display module 110. For example, the processor 114 may be connected with the IR signal receiver 111, the first wired port 112, and the second wired port 113, and control the operations of the first display module 110.

According to various embodiments, the processor 114 may be referred to by various names such as a digital signal processor (DSP), a microprocessor, a central processing unit (CPU), a micro controller unit (MCU), a micro processing unit (MPU), a neural processing unit (NPU), a controller, an application processor (AP), etc., but it will be described as the processor 114 in this disclosure.

The processor 114 may be implemented as a system on chip (SoC) and large scale integration (LSI), or implemented in the form of a field programmable gate array (FPGA). Also, the processor 114 may include a volatile memory such as an SRAM, etc.

Meanwhile, the operations described as the functions of the first display module 110 in FIG. 2 may be performed by the processor 114.

Figure 4:
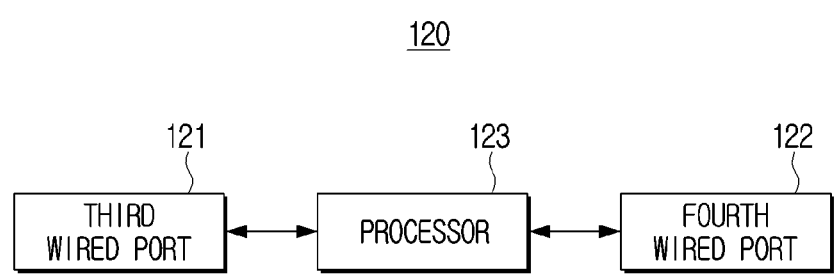
FIG. 4 is a block diagram illustrating an example configuration of a second display module according to various embodiments.

FIG. 4 is a block diagram illustrating an example configuration of a second display module according to various embodiments.

According to FIG. 4, the second display module 120 may include a third wired port 121, a fourth wired port 122, and a processor (e.g., including processing circuitry) 123.

The third wired port 121 is a component to which the first LAN cable connecting the first display module 110 and the second display module 120 is coupled. The third wired port may include a plurality of pins corresponding to the first pin and the plurality of second pins included in the coupling portion of the first LAN cable.

The fourth wired port 122 is a component to which the third LAN cable connecting the second display module 120 and the third display module is coupled. The fourth wired port may include a plurality of pins corresponding to the first pin and the plurality of second pins included in the coupling portion of the third LAN cable.

The processor 123 may include various processing circuitry and controls the overall operations of the second display module 120. For example, the processor 123 may be connected with each component of the second display module 120, and control the overall operations of the second display module 120. For example, the processor 123 may be connected with the third wired port 121 and the fourth wired port 122, and control the operations of the second display module 120.

According to various embodiments, the processor 123 may be referred to by various names such as a digital signal processor (DSP), a microprocessor, a central processing unit (CPU), a micro controller unit (MCU), a micro processing unit (MPU), a neural processing unit (NPU), a controller, an application processor (AP), etc., but it will be described as the processor 123 in this disclosure.

The processor 123 may be implemented as a system on chip (SoC) and large scale integration (LSI), or implemented in the form of a field programmable gate array (FPGA). Also, the processor 123 may include a volatile memory such as an SRAM, etc.

Meanwhile, the operations described as the functions of the second display module 120 in FIG. 2 may be performed by the processor 123.

Figure 5:
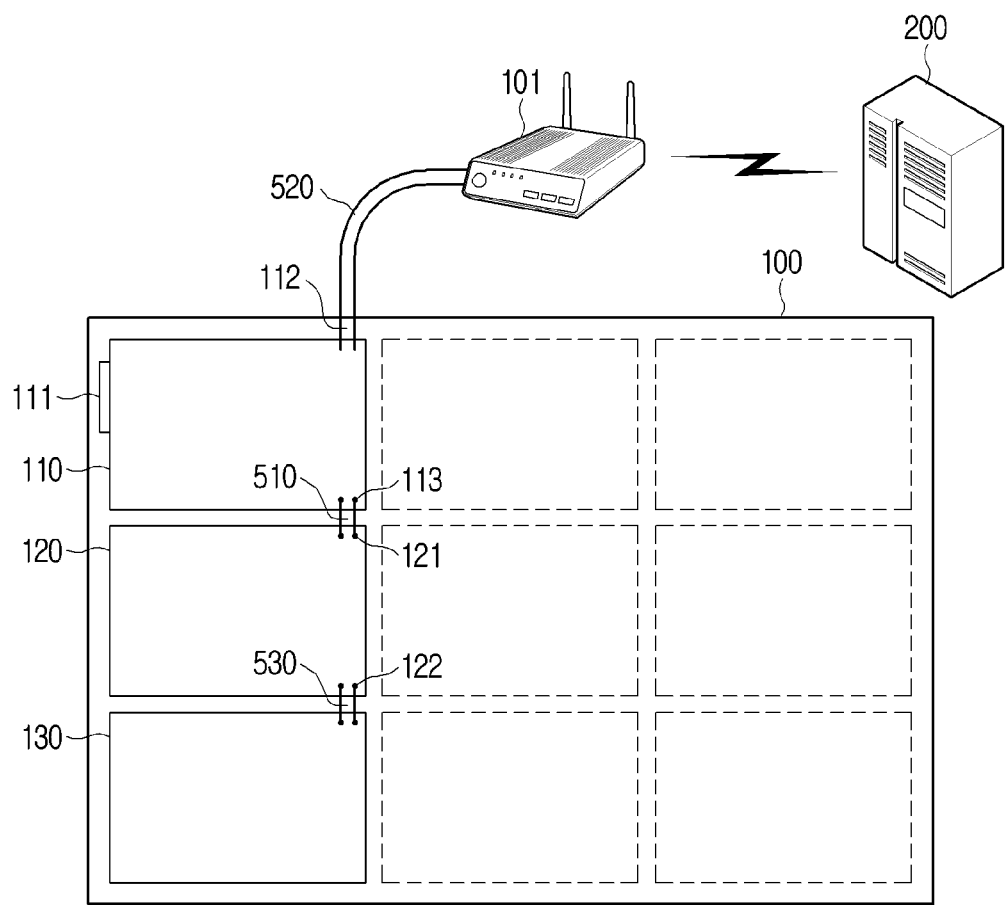
FIG. 5 is a diagram illustrating a system including a display apparatus according to various embodiments.

FIG. 5 is a diagram illustrating an example system including a display apparatus according to various embodiments.

According to FIG. 5, the display apparatus 100 may be connected with an external apparatus 101. Here, the external apparatus 101 may be a set-top box, but is not limited thereto. The external apparatus 101 according to various embodiments may electronically communicate with the server 200, and receive a control signal for controlling a display module included in the display apparatus 100 from the server 200.

The control signal that the external apparatus 101 received from the server 200 may be transmitted to the display apparatus 100 through the second LAN cable 520. Here, the first display module 110 included in the display apparatus 100 may receive the control signal from the external apparatus 101 through the first wired port 112.

The control signal according to various embodiments may be transmitted from the server 200 to the external apparatus 101 based on a user located in a space other than the space wherein the display apparatus 100 is installed generating an event for controlling the display apparatus 100 remotely.

Meanwhile, the external apparatus 101 may not only receive a control signal from the server 200, but may also receive an IR signal from the remote control apparatus by including an IR signal receiver (not shown) in itself. In this case, the external apparatus 101 may transmit the received IR signal to the first display module 110 through the second LAN cable 520.

The first display module 110 according to various embodiments may transmit at least one of the control signal or the IR signal received from the external apparatus 101 or the IR signal received through the IR signal receiver 111 to the second display module 120 through the first LAN cable 510.

The second display module 120 may transmit at least one of the IR signal or the control signal received from the first display module 110 to the third display module 130 through the third LAN cable 530.

Although not illustrated in detail, the third display module 130 may be connected with the fourth display module located on the right side of the third display module 130 through a LAN cable, and this is also the same in the relations among the display modules afterwards. This may be referred to, for example, as a daisy chain method, and accordingly, the plurality of display modules 110, 120, 130, etc. included in the display apparatus 100 may be consecutively connected, and transmit and receive information with one another.

Figure 6A:
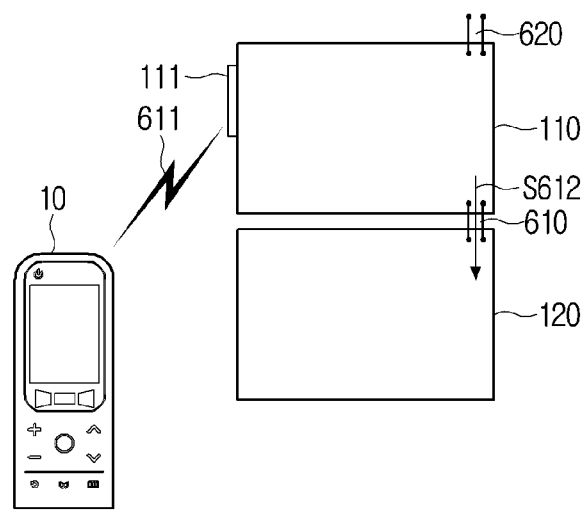
FIG. 6A and FIG. 6B are diagrams illustrating an example method of controlling a display module according to various embodiments.
Figure 6B:
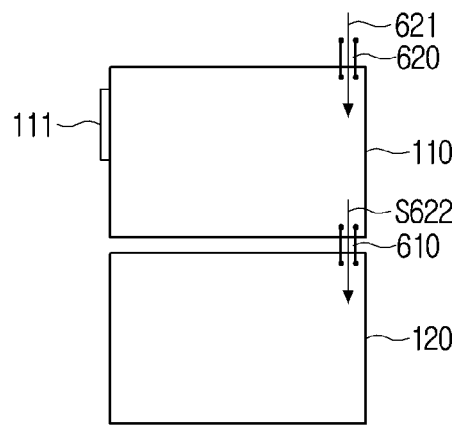

FIG. 6A and FIG. 6B are diagrams illustrating an example method of controlling a display module according to various embodiments.

According to FIG. 6A, the first display module 110 may receive an IR signal 611 for field control from the remote control apparatus through the IR signal receiver 111.

Here, the first display module 110 may transmit the received IR signal 611 to the second display module 120 through the first LAN cable 610 coupled to the second wired port in operation S612. Specifically, the first display module 110 may transmit the received IR signal to the second display module 120 through the first pin corresponding to transmission of an IR signal in the second wired port and the first LAN cable in operation S612.

According to FIG. 6B, the first display module 110 may receive a control signal 621 for remote control from the external apparatus through the second LAN cable 620.

Here, the first display module 110 may transmit the received control signal 621 to the second display module 120 through the first LAN cable 610 coupled to the second wired port in operation S622. Specifically, the first display module 110 may transmit the received control signal to the second display module 120 through the plurality of second pins corresponding to transmission of a control signal in the second wired port and the first LAN cable in operation S622.

Figure 7:
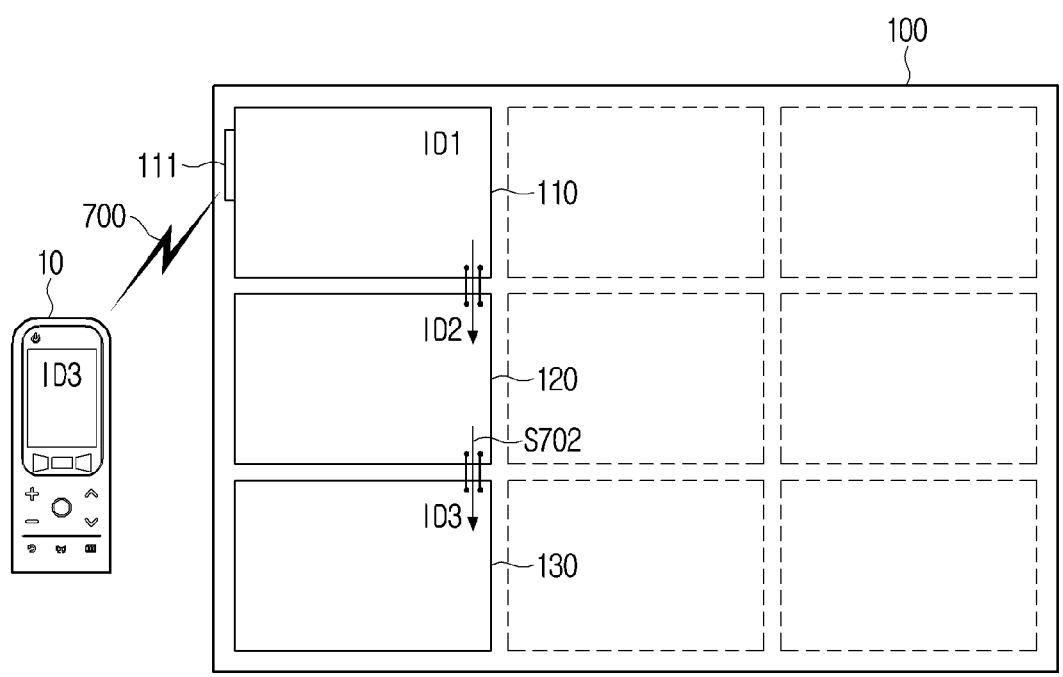
FIG. 7 is a diagram illustrating an example method of controlling a display module through an IR signal according to various embodiments.

FIG. 7 is a diagram illustrating an example method of controlling a display module through an IR signal according to various embodiments.

When the second display module 120 is connected through the first LAN cable, the first display module 110 according to various embodiments may acquire identification information of the second display module 120, and identify whether the second display module 120 is a device of the same type as the first display module 110 based on the acquired identification information. Here, the type of the display module may be information related to at least one of the manufacturer, the model name, or the screen size.

If it is identified that the second display module 120 is a device of the same type as the first display module 110, the first display module 110 may allot address identification information to the second display module 120, and transmit the allotted address identification information to the second display module 120 through the first LAN cable. Specifically, the first display module 110 may allot address identification information corresponding to 'ID1' to itself, and allot address identification information corresponding to 'ID2' to the second display module 120, and transmit the address identification information corresponding to 'ID2' to the second display module 120.

Also, the first display module 110 may transmit together address identification information of the third display module 130 other than the second display module 120 to the second display module 120. The second display module 120 that received the address identification information from the first display module 110 may transmit the address identification information allotted to the third display module 130 to the third display module 130 through the third LAN cable.

Meanwhile, it is also possible that the first display module 110 transmits only the address identification information of the second display module 120 to the second display module 120, and the second display module 120 allots address identification information of the third display module 130, and then transmits the allotted address identification information to the third display module 130. Specifically, the second display module 120 may allot address identification information corresponding to 'ID3' to the third display module 130, and then transmit the address identification information corresponding to 'ID3' to the third display module 130.

The first display module 110 according to various embodiments may, if an IR signal 700 is received from the remote control apparatus 10 through the IR signal receiver 111, transmit the received IR signal 700 to at least one display module based on the address identification information included in the received IR signal 700 and the address identification information allotted to each display module. Specifically, in case the user performs a manipulation for controlling the display module having the address identification information corresponding to 'ID3,' the IR signal 700 received from the remote control apparatus 10 may include the address identification information corresponding to 'ID3.' The first display module 110 may transmit the received IR signal to the third display module 130 having the same address identification information as the address identification information included in the IR signal 700.

For this, the first display module 110 may transmit the received IR signal 700 and the address identification information corresponding to 'ID3' to the second display module 120 in operation S702, and the second display module 120 that received them may transmit the received IR signal 700 to the third display module 130 having the address identification information corresponding to 'ID3' in operation S702.

Through this, the display apparatus 100 can correctly control a specific display module that the user desires to control. Although not illustrated in FIG. 7, not only in a case wherein an IR signal is received from the remote control apparatus 10 but also in a case wherein a control signal for remote control is received from the external apparatus, the display apparatus 100 may control a specific display module based on the address identification information included in the signal.

Figure 8:
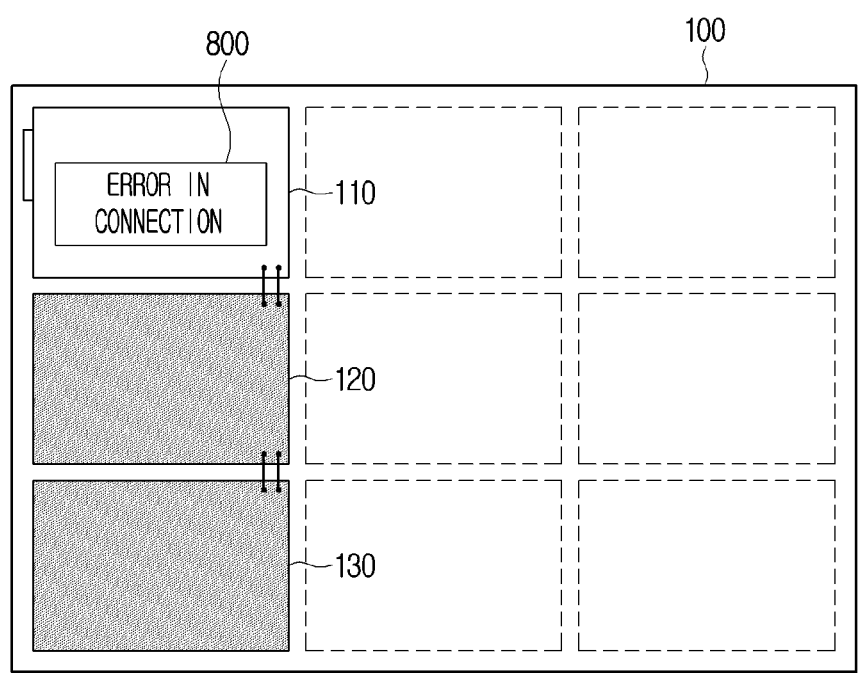
FIG. 8 is a diagram illustrating an example UI displayed regarding an error in connection according to various embodiments.

FIG. 8 is a diagram illustrating an example UI displayed regarding an error in connection according to various embodiments.

After the second display module 120 is connected through the first LAN cable, the first display module 110 according to various embodiments may acquire identification information of the second display module 120, and if it is identified that the second display module 120 is a device of a different type from the first display module based on the acquired identification information, display a guide UI 800 indicating an error in the connection of the display module.

According to various embodiments, in at least one case among a case wherein the manufacturers of the first display module 110 and the second display module 120 are different, a case wherein the first display module 110 and the second display module 120 are different models, or a case wherein the screen sizes of the first display module 110 and the second display module 120 are different, the first display module 110 may not perform communication with other display modules included in the display apparatus 100 including the second display.

Accordingly, the display modules including the second display module 120 and the third display module 130 cannot receive an image signal from the first display module 110, and thus they may not provide an image. Meanwhile, the first display module 110 may display a guide UI 800 instructing that the first display module 110 cannot be connected with the display modules included in the display apparatus 100.

Figure 9A:
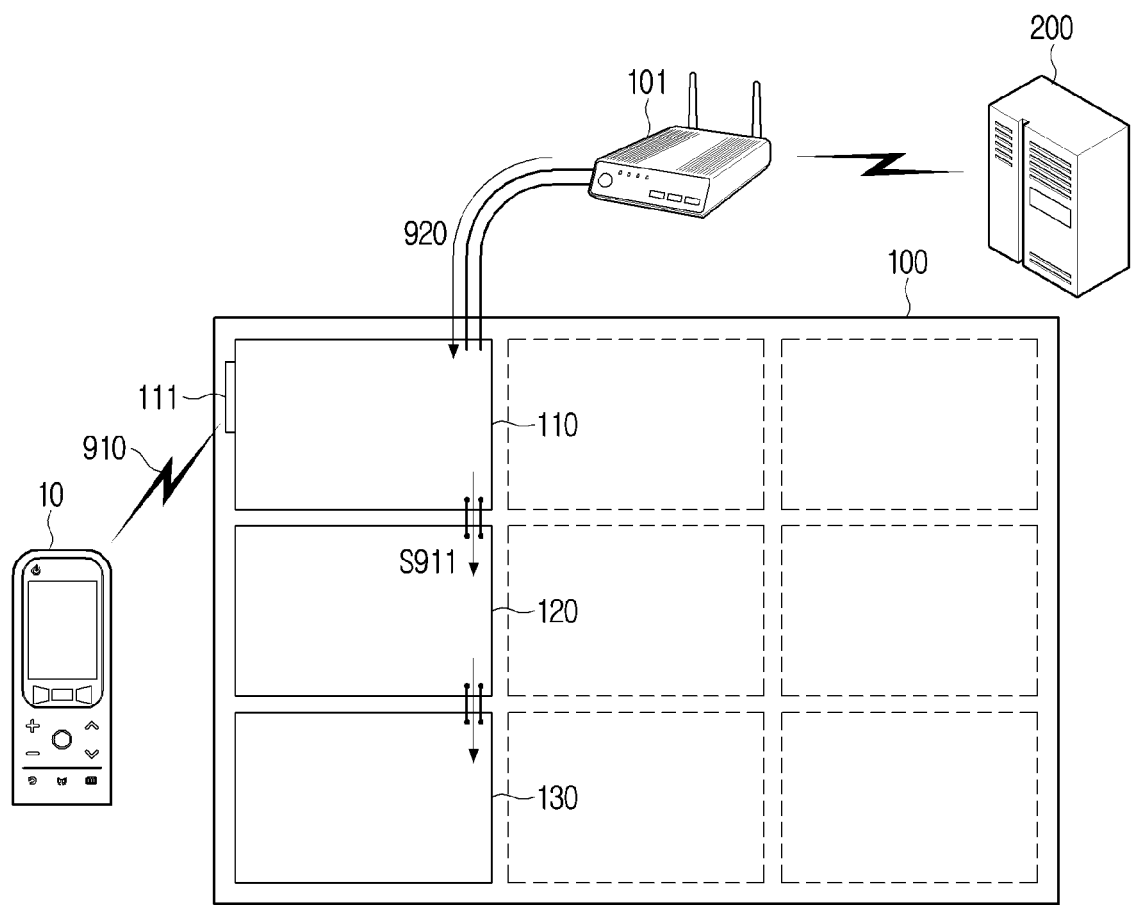
FIG. 9A and FIG. 9B are diagrams illustrating an example operation of giving or assigning priorities according to various embodiments.
Figure 9B:
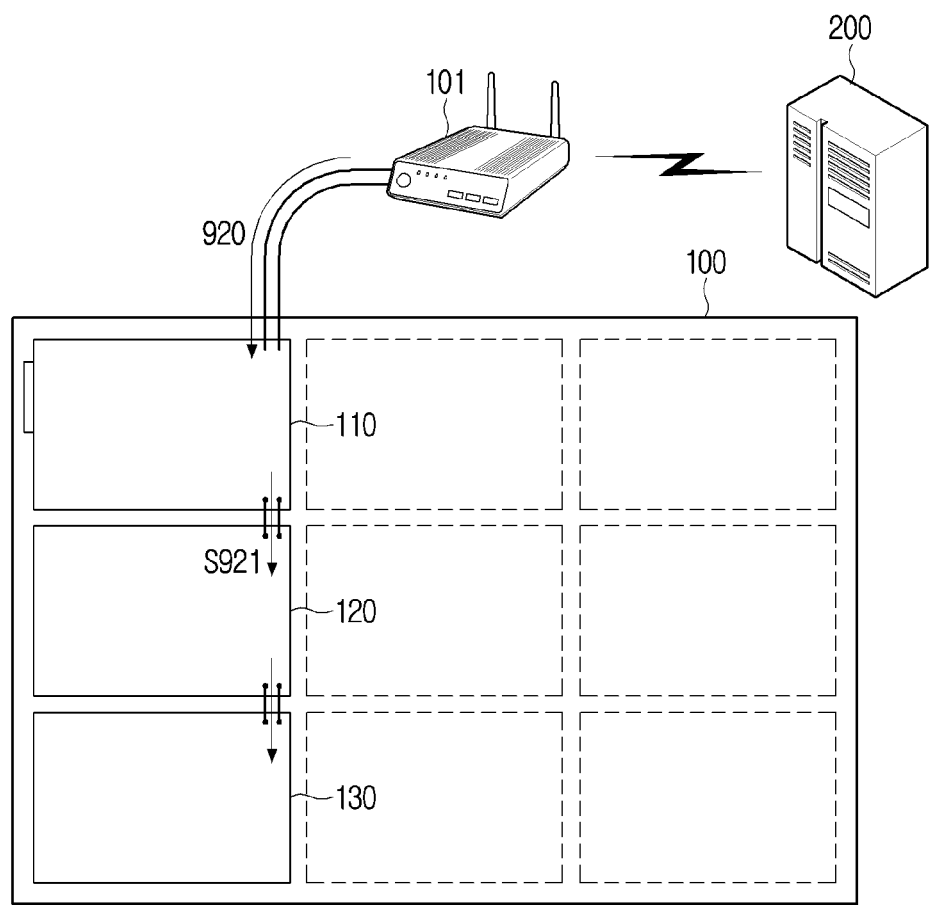

FIG. 9A and FIG. 9B are diagrams illustrating an example operation of giving (e.g., assigning) priorities according to various embodiments. In FIG. 9A and FIG. 9B, operations of the display apparatus 100 will be described by expressing an IR signal received from the remote control apparatus 10 as a first display setting signal, and a control signal received from the external apparatus 101 as a second display setting signal, for describing functions performed by the display apparatus 100 in a process of initially installing the display apparatus 100 or repairing or inspecting the display apparatus 100.

According to FIG. 9A, the display apparatus 100 may simultaneously receive a first display setting signal 910 for field control and a second display setting signal 920 for remote control.

Here, in case the first display setting signal 910 and the second display setting signal 920 are related to instructions that are in contrast with each other, for example, in case the first display setting signal 910 is a signal corresponding to an instruction for increasing the brightness of the plurality of display modules, and the second display setting signal is a signal corresponding to an instruction for decreasing the brightness of the plurality of display modules, the first display module 110 may give priorities based on the characteristics of the first display setting signal 910 and the second display setting signal 920, and control the display apparatus 100 based on the display setting signal having a higher priority.

For example, in case the second display setting signal 920 is a UART communication signal or an Ethernet communication signal, the first display module 110 may give a lower priority to the second display setting signal 920 than the first display setting signal 910. This is a case wherein the external apparatus 101 transmits a control signal received from the server 200 to the display apparatus 100, and the first display module 110 may control the display apparatus 100 based on the first display setting signal 910 corresponding to the instruction for field control rather than the second display setting signal 920 corresponding to the instruction for remote control.

In this case, the first display module 110 may transmit a signal corresponding to the first display setting signal 910 received through the IR signal receiver 111 to the second display module 120 through the first LAN cable in operation S911.

In case the second display setting signal 920 is an IR signal, the first display module 110 may give a higher priority to the second display setting signal 920 than the first display setting signal 910. This is a case wherein the user's instruction was input through the IR signal receiver provided on the external apparatus 101, and the first display module 110 may control the display apparatus 100 based on the second display setting signal 920 in consideration of the user's intent to control the display apparatus 100 through the IR signal receiver provided on the external apparatus 101 but not the IR signal receiver 111 provided on the first display module.

According to FIG. 9B, the display apparatus 100 may receive only the second display setting signal 920 for remote control. In this case, the first display module 110 may control the display apparatus 100 based on the second display setting signal 920 regardless of what kind of signal the second display setting signal 920 is.

For example, the first display module 110 that received only the second display setting signal 920 from the external apparatus 101 may transmit a signal corresponding to the second display setting signal 920 to the second display module 120 through the first LAN cable in operation S921.

Figure 10:
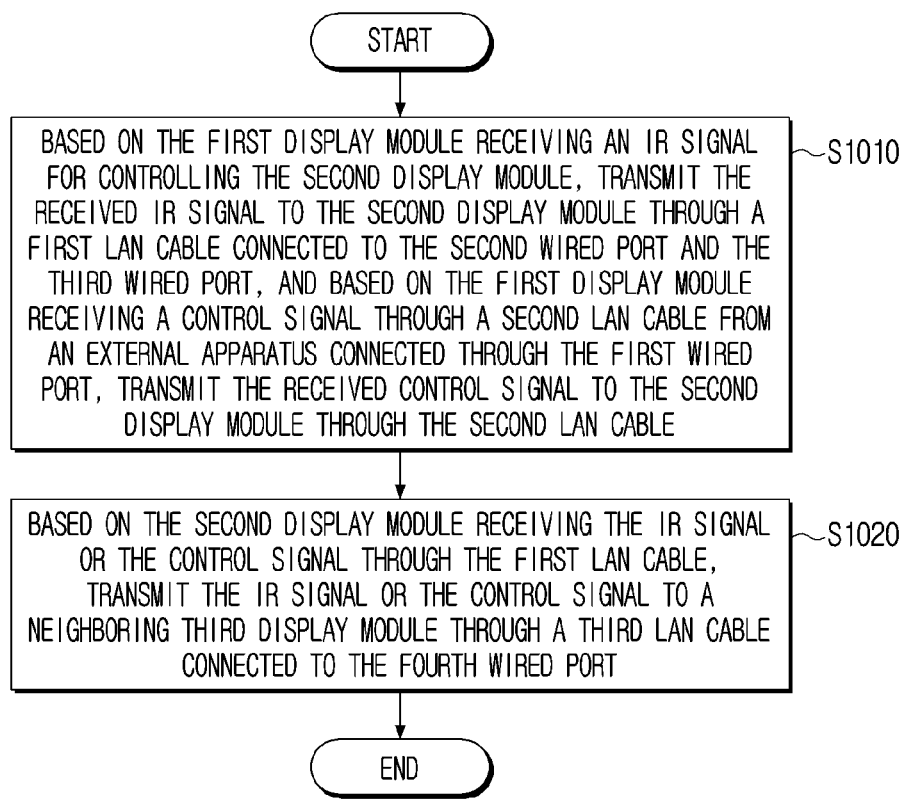
FIG. 10 is a flowchart illustrating an example method according to various embodiments.

FIG. 10 is a flowchart illustrating an example method of controlling a display apparatus according to various embodiments.

According to a controlling method for a display apparatus including a first display module including an infrared ray (IR) signal receiver and a first wired port and a second wired port to which local area network (LAN) cables are connected, and a second display module including a third wired port and a fourth wired port to which local area network (LAN) cables are connected according to various embodiments of the disclosure, if the first display module receives an IR signal for controlling the second display module, the received IR signal is transmitted to the second display module through a first LAN cable connected to the second wired port and the third wired port, and if the first display module receives a control signal through a second LAN cable from an external apparatus connected through the first wired port, the received control signal is transmitted to the second display module through the second LAN cable in operation S1010.

Then, if the second display module receives the IR signal or the control signal through the first LAN cable, the IR signal or the control signal is transmitted to a neighboring third display module through a third LAN cable connected to the fourth wired port in operation S1020.

Here, each of the second wired port and the third wired port may include a first pin corresponding to the IR signal and a plurality of second pins corresponding to the control signal.

The control signal may include a universal asynchronous receiver/transmitter (UART) communication signal or an Ethernet communication signal, and the plurality of second pins may include a pin corresponding to the UART communication signal or a pin corresponding to the Ethernet communication signal.

In addition, in operation S1010 of transmitting to the second display module, if the first display module and the second display module are connected through the first LAN cable, identification information of the second display module may be acquired, and if it is identified that the second display module is a device of the same type as the first display module based on the identification information, address identification information may be allotted to the second display module, and the allotted address identification information may be transmitted to the second display module through the first LAN cable.

In operation S1020 of transmitting to the third display module, if the second display module receives address identification information allotted to the third display module from the first display module, the allotted address identification information may be transmitted to the third display module through the third LAN cable.

In operation S1010 of transmitting to the second display module, at least one of the received IR signal or control signal may be transmitted to the second display module based on the address identification information allotted to the second display module.

Meanwhile, the controlling method may further include, based on the second display module being connected through the first LAN cable, acquiring identification information of the second display module, and based on identifying that the second display module is a device of a different type from the first display module based on the identification information, displaying a guide UI indicating an error in the connection of the display module.

In operation S1010 of transmitting to the second display module, if a display setting signal is received through the IR signal receiver after the second display module is connected through the first LAN cable, the received display setting signal may be transmitted to the second display module through the first pin.

Meanwhile, the first LAN cable may include pins corresponding to a plurality of respective signals by different communication methods.

The controlling method may further include, based on receiving a first display setting signal through the IR signal receiver and receiving a second display setting signal from the external apparatus through the second LAN cable after the second display module is connected through the first LAN cable, giving priorities based on characteristics of the first display setting signal and the second display setting signal.

Meanwhile, methods according to the aforementioned various embodiments of the disclosure may be implemented in forms of applications that can be installed on conventional display apparatuses.

The methods according to the aforementioned various embodiments of the disclosure may be implemented just with software upgrade, or hardware upgrade of conventional display apparatuses.

In addition, the aforementioned various embodiments of the disclosure may be performed through an embedded server provided on a display apparatus, or at least one external server.

Meanwhile, the aforementioned various embodiments may be implemented in a recording medium that can be read by a computer or an apparatus similar to a computer, using software, hardware, or a combination thereof. In some cases, the embodiments described in this disclosure may be implemented as the processor 120 itself. According to implementation by software, the embodiments such as procedures and functions described in this disclosure may be implemented as separate software modules. Each of the software modules can perform one or more functions and operations described in this disclosure.

Meanwhile, computer instructions for performing processing operations of the display apparatus 100 according to the aforementioned various embodiments of the disclosure may be stored in a non-transitory computer-readable medium. Computer instructions stored in such a non-transitory computer-readable medium make the processing operations at the display apparatus 100 according to the aforementioned various embodiments performed by a specific machine, when the instructions are executed by the processor of the specific machine.

A non-transitory computer-readable medium may refer, for example, to a medium that stores data semi-permanently, and is readable by machines. As examples of a non-transitory computer-readable medium, there may be a CD, a DVD, a hard disc, a blue-ray disc, a USB, a memory card, a ROM and the like.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display apparatus comprising:
a first display module comprising an infrared (IR) signal receiver, a first wired port and a second wired port configured to be connected to local area network (LAN) cables; and
a second display module comprising a third wired port and a fourth wired port configured to be connected to local area network (LAN) cables,
wherein the first display module is configured to:
based on an IR signal received through the IR signal receiver being a signal for controlling the second display module, control to transmit the received IR signal to the second display module through at least a first LAN cable connected to the second wired port and the third wired port, each of the second wired port and the third wired port comprising a first pin corresponding to the IR signal and a plurality of second pins corresponding to the control signal,
based on receiving a control signal through a second LAN cable from an external apparatus connected through the first wired port, transmit the received control signal to the second display module through the second LAN cable, and wherein the second display module is configured to:
based on receiving the IR signal or the control signal through the first LAN cable, control to transmit the IR signal or the control signal to a neighboring third display module through at least a third LAN cable connected to the fourth wired port.

2. The display apparatus of claim 1,
wherein the control signal comprises:
a universal asynchronous receiver/transmitter (UART) communication signal or an Ethernet communication signal, and
the plurality of second pins comprise:
a pin corresponding to the UART communication signal or a pin corresponding to the Ethernet communication signal.

3. The display apparatus of claim 1,
wherein the first display module is configured to:
based on the second display module being connected through the first LAN cable, acquire identification information of the second display module,
based on identifying that the second display module is a device of the same type as the first display module based on the identification information, allot address identification information to the second display module, and
transmit the allotted address identification information to the second display module through the first LAN cable.

4. The display apparatus of claim 3,
wherein the second display module is configured to:
based on receiving address identification information allotted to the third display module from the first display module, transmit the allotted address identification information to the third display module through the third LAN cable.

5. The display apparatus of claim 3,
wherein the first display module is configured to:
transmit at least one of the received IR signal or control signal to the second display module based on the address identification information allotted to the second display module.

6. The display apparatus of claim 1,
wherein the first display module is configured to:
based on the second display module being connected through the first LAN cable, acquire identification information of the second display module, and based on identifying that the second display module is a device of a different type from the first display module based on the identification information, display a guide user interface (UI) indicating an error in the connection of the display module.

7. The display apparatus of claim 1,
wherein the first display module is configured to:
based on receiving a display setting signal through the IR signal receiver after the second display module is connected through the first LAN cable, transmit the received display setting signal to the second display module through a first pin.

8. A display apparatus comprising:
a first display module comprising an infrared (IR) signal receiver, a first wired port and a second wired port configured to be connected to local area network (LAN) cables; and
a second display module comprising a third wired port and a fourth wired port configured to be connected to local area network (LAN) cables,
wherein the first display module is configured to:
based on an IR signal received through the IR signal receiver being a signal for controlling the second display module, transmit the received IR signal to the second display module through a first LAN cable connected to the second wired port and the third wired port, wherein the first LAN cable comprising pins corresponding to a plurality of respective signals by different communication methods,
based on receiving a control signal through a second LAN cable from an external apparatus connected through the first wired port, transmit the received control signal to the second display module through the second LAN cable, and
the second display module is configured to:
based on receiving the IR signal or the control signal through the first LAN cable, transmit the IR signal or the control signal to a neighboring third display module through a third LAN cable connected to the fourth wired port.

9. The display apparatus of claim 1,
wherein the first display module is configured to:
based on receiving a first display setting signal through the IR signal receiver and receiving a second display setting signal from the external apparatus through the second LAN cable after the second display module is connected through the first LAN cable, assign priorities based on characteristics of the first display setting signal and the second display setting signal.

10. A method of controlling a display apparatus comprising a first display module comprising an infrared ray (IR) signal receiver and a first wired port and a second wired port configured to be connected to local area network (LAN) cables, and a second display module comprising a third wired port and a fourth wired port configured to be connected to local area network (LAN) cables, the method comprising:
based on the first display module receiving an IR signal for controlling the second display module, transmitting the received IR signal to the second display module through a first LAN cable connected to the second wired port and the third wired port, and based on the first display module receiving a control signal through a second LAN cable from an external apparatus connected through the first wired port, transmitting the received control signal to the second display module through the second LAN cable; and
based on the second display module receiving the IR signal or the control signal through the first LAN cable, transmitting the IR signal or the control signal to a neighboring third display module through a third LAN cable connected to the fourth wired port,
wherein each of the second wired port and the third wired port comprises a first pin corresponding to the IR signal and a plurality of second pins corresponding to the control signal.

11. The method of claim 10,
wherein the control signal comprises:
a universal asynchronous receiver/transmitter (UART) communication signal or an Ethernet communication signal, and
the plurality of second pins comprise:
a pin corresponding to the UART communication signal or a pin corresponding to the Ethernet communication signal.

12. The method of claim 10,
wherein the transmitting to the second display module comprises:
based on the first display module and the second display module being connected through the first LAN cable, acquiring identification information of the second display module;
based on identifying that the second display module is a device of the same type as the first display module based on the identification information, allotting address identification information to the second display module; and
transmitting the allotted address identification information to the second display module through the first LAN cable.

13. The method of claim 12,
wherein the transmitting to the third display module comprises:
based on the second display module receiving address identification information allotted to the third display module from the first display module, transmitting the allotted address identification information to the third display module through the third LAN cable.

14. The method of claim 10,
wherein the transmitting to the second display module comprises:
transmitting at least one of the received IR signal or control signal to the second display module based on the address identification information allotted to the second display module.

15. The method of claim 10, further comprises:
based on the second display module being connected through the first LAN cable, acquire identification information of the second display module, and based on identifying that the second display module is a device of a different type from the first display module based on the identification information, displaying, by the first display module, a guide user interface (UI) indicating an error in the connection of the display module.

16. The method of claim 10,
wherein the transmitting to the second display module comprises:
based on receiving a display setting signal through the IR signal receiver after the second display module is connected through the first LAN cable, transmitting the received display setting signal to the second display module through a first pin.

17. The method of claim 10, further comprises:
based on receiving a first display setting signal through the IR signal receiver and receiving a second display setting signal from the external apparatus through the second LAN cable after the second display module is connected through the first LAN cable, assigning, by the first display module, priorities based on characteristics of the first display setting signal and the second display setting signal.

* * * * *